Oct. 11, 1960  G. F. BREWSTER  2,955,829
WORK HOLDING CHUCK
Filed July 16, 1958  2 Sheets-Sheet 1
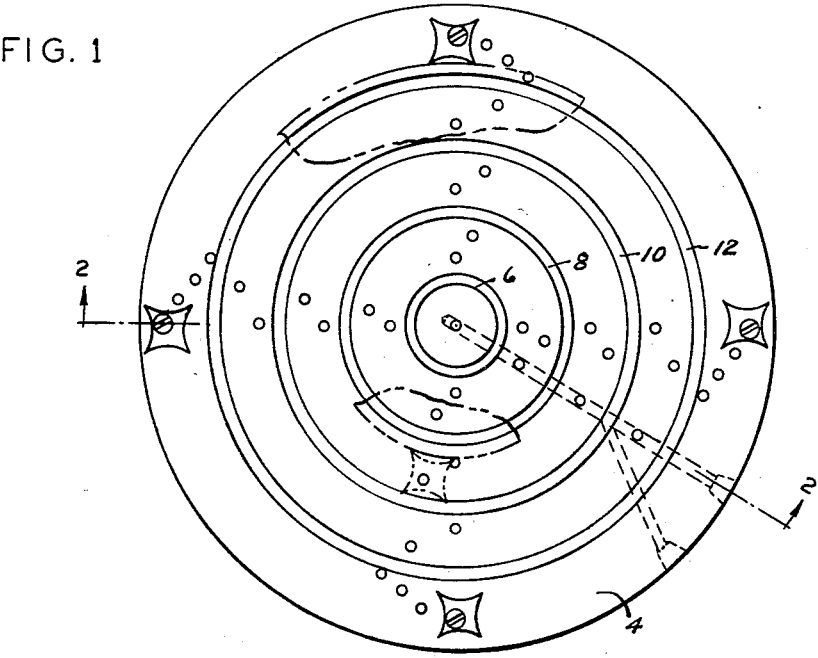
FIG. 1
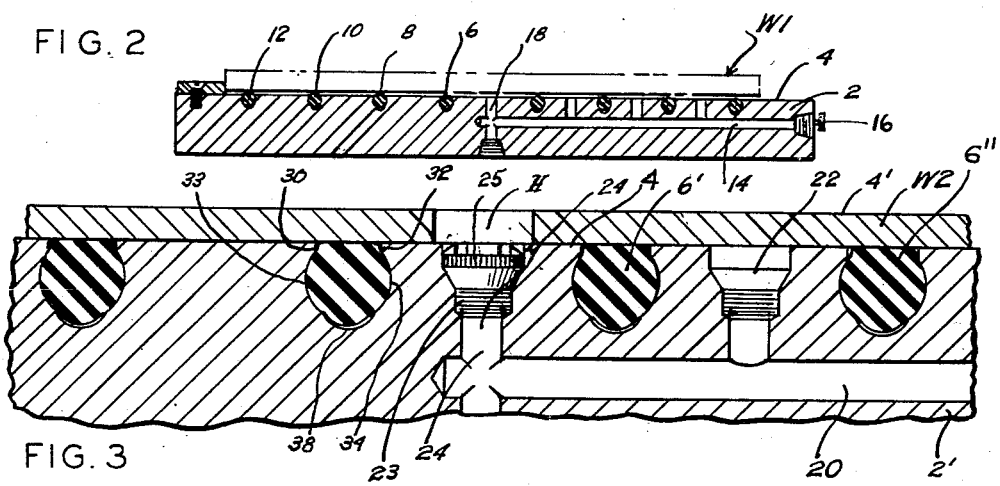
FIG. 2
FIG. 3
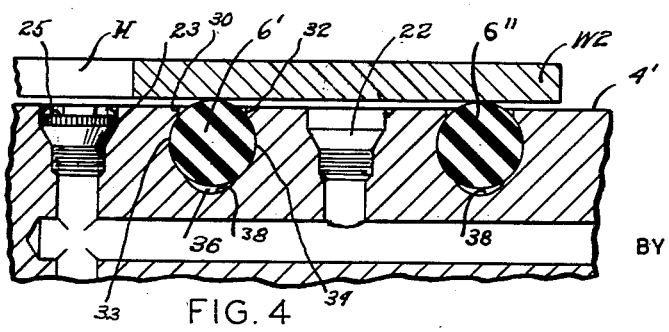
FIG. 4
INVENTOR
George F. Brewster
BY
ATTORNEY Oct. 11, 1960 G. F. BREWSTER 2,955,829
WORK HOLDING CHUCK
Filed July 16, 1958 2 Sheets-Sheet 2

INVENTOR
George F. Brewster
BY
Monroe T. Hamilton
ATTORNEY

United States Patent Office 2,955,829
Patented Oct. 11, 1960

2,955,829

WORK HOLDING CHUCK

George F. Brewster, Ford Lane, Kittery, Maine

Filed July 16, 1958, Ser. No. 748,895

3 Claims. (Cl. 279—3)

The present invention relates to an improved workholding chuck of the vacuum operated type for use in holding surfaces of workpieces which are to be subjected to various machining operations, or possibly other treatment or examination. This invention is an improvement on the vacuum chuck described and claimed in U.S. Patent No. 2,730,370 issued to me January 10, 1956.

In the earlier form of invention disclosed in this patent means were provided for supporting an elastic sealing ring of toric cross section, in a workholding element in such a position that suction forces could be exerted within the area defined by the sealing ring for a number of types of workpieces to be dealt with. This form of suction has been found to be highly satisfactory. However, in certain other classes of work such as pieces of annular form or some other shape involving a hole at or near the center, the chuck of the patent could not be used since the necessary suction forces could not be exerted where a hole was present.

The present invention is concerned with the problem indicated and aims to provide an improved method and apparatus of the vacuum operated type for holding workpieces. It is especially an object of the invention to devise a unitary sealing ring and cooperating sealing groove for providing in a workholding element a suitable gripping action either externally or internally of an annular workpiece. It is further an object of the invention to combine with this specially devised form of sealing means selectively controlled suction means for exerting suction forces from points either internally or externally of respective areas of the sealing ring.

These and other objects and novel features will be more fully understood and appreciated from the following description of a preferred embodiment of the invention selected for purposes of illustration and shown in the accompanying drawings, in which:

Fig. 1 is a plan view of the improved chuck of the invention;

Fig. 2 is a cross section taken on the line 2—2 of Fig. 1;

Fig. 3 is an enlarged cross section generally corresponding to the structure shown in Fig. 2, but indicating an annular workpiece in a vacuum held position;

Fig. 4 is still another enlarged detailed cross section showing another position of the chuck mechanism.

Figure 5:
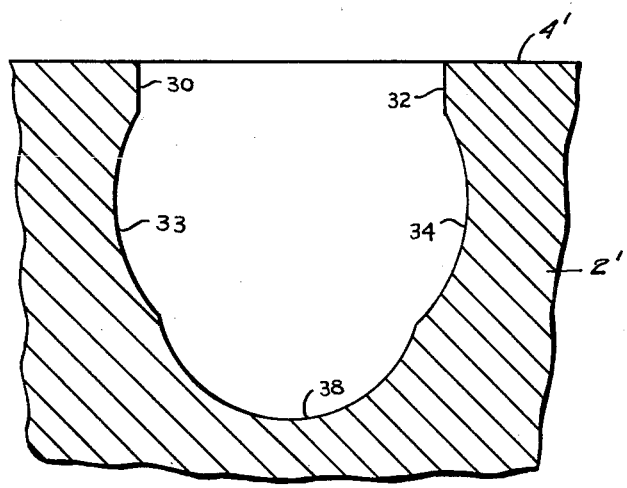
Fig. 5 is an enlarged cross sectional detailed view of the ring retaining groove of the invention.

The present invention is based on the novel concept of utilizing an elastic sealing ring of the same general toric cross section as described in my patent noted above. This ring may be supported to provide a seal for various types of workpieces including a workpiece without a hole at or near its center. Two of these rings may be used to secure a workpiece with a hole in its center.

I find this concept of utilizing one type of elastic sealing ring for dealing with two different classes of workpieces may be practically realized by containing the elastic ring in a work holding element presenting a flat face which is recessed to provide special ring retaining grooves. Each ring retaining groove is designed to support the elastic sealing ring in a position such that a part of the sealing ring projects slightly above the face of the workholding element. The groove is defined by a plurality of intersecting curved surfaces. Two of the surfaces are single curved surfaces of cylindrical shape lying in concentrically spaced relationship to one another. These surfaces provide an entering aperture for inserting the sealing ring in the position described. Immediately below these spaced cylindrical surfaces are two double curved surfaces and at the bottom of the groove is still a third double curved surface. The two double curved surfaces constitute inner and outer tore sealing surfaces generated by the revolution of a conic about an axis which lies in its plan; which is parallel to the flat face; and which is located below the flat face, a distance less than the radius of the conic. The space between the double curved surfaces is chosen of a magnitude corresponding to the diameter of the toric section of the sealing ring, thus when the sealing ring has been forced into the entering opening it may be crowded down into the space between the two double curved sealing surfaces and will completely fill this portion of the groove. The bottom double curved surface is generated by revolution of a conic whose axis lies below the axis of the double curved surfaces and thus there is formed a space into which a portion of the sealing ring may be compressed.

In the special form of double curved sealing surface described, the inner tore sealing surface operates to hold an adjacent surface of the sealing ring in a sealed position with respect to a workpiece which is formed without any central opening and the relieved bottom affords a space into which compressed portions of the sealing ring may be displaced when a workpiece is subjected to suction and held against the flat face by atmospheric pressure.

Similarly, the outer tore sealing surfaces function to hold an outer surface of the sealing ring in a sealed position when it is desired to handle a workpiece having an annular shape and suction cannot be exerted within the ring because of the hole at or near the center. In this case a second outer sealing ring is used and suction removes air from points circumferentially outside the inner ring and inside the outer ring the inner sealing ring takes atmospheric pressure pushing from the center outwardly, while the outer sealing ring takes atmospheric pressure pushing from the outside radially inwardly.

Referring more in detail to the drawing, attention is directed to Figs. 1 and 2 in which numeral 2 denotes a workholding element of circular shape and formed with a flat face 4. In the flat face are formed a series of special ring retaining grooves having received therein elastic sealing rings as 6, 8, 10 and 12.

The work holding element is recessed to provide a plurality of radially extending passageways and each passageway is connected to respective axially extending passageways which communicate with spaces adjacent to the ring grooves of varying sizes referred to above. These passageways are fitted with closure plugs so that one groove or passageway may be subjected to suction forces independently of all other grooves. In some cases a given passageway may be closed by insertion of a plug so that suction forces can be exerted only through a passageway occurring circumferentially outside of an inner sealing ring and inside of an outer sealing ring. This is particularly the case when it is desired to use two sealing rings with a workpiece having a hole at or near its center. In other cases passageway may communicate with only an opening occurring centrally inside of a sealing ring.

As illustrative of one simple form of air passageway for a workpiece W–1, having no hole at or near its center, I have shown in Fig. 2 an air passageway 14 which can be opened or closed by a valve fitting 16. This passageway 14 may connect with an axial passageway 18 occurring within an area included by the sealing ring 6. Thus, when suction forces are exerted through these passageways 14 and 18, the sealing ring is drawn radially inwardly to form a seal, as is hereinafter described in greater detail.

In Fig. 3 I have shown another suction arrangement in a work holding element 2' having an inner sealing ring 6' and an outer sealing ring 6" for dealing with work piece W-2 which is annular in form and does have a hole H at or near its center. This work holding element is formed with air passageways 20 and 24. In this arrangement, an air passageway 20, suitably controlled by a conventional valve fitting and connected to a suction pump, connects with an open axial passageway 22 lying between rings 6' and 6" but passageway 24 is sealed off by means of a threaded plug 23 having a rubber gasket 25 and, thus atmospheric pressure will push radially inward against the ring 6" and radially outwardly against the ring 6'. In this way, the inner sealing ring is drawn radially outwardly against an adjacent special groove surface while the outer ring 6" is drawn radially inwardly against an adjacent groove surface.

Considering in greater detail the parts shown in Fig. 3, annular work piece W-2, as indicated therein, occurs in a completely sealed position by means of rings 6' and 6", being held by atmospheric pressure against the work holding element 2'. In this position, the inner elastic sealing ring 6' is compressed and sealed in its ring retaining groove by atmospheric pressure acting on the ring in a radially outwardly directed manner and by atmospheric pressure acting on the outer ring in a radially inwardly directed manner.

Attention is directed to Fig. 5 in which is shown an enlarged view of a groove construction of the invention which may be used for either a single ring or two ring type of sealing. As noted therein numerals 30 and 32 denote single curved surfaces of cylindrical form lying in concentrically spaced relationship to one another. These surfaces correspond to similar surfaces bearing the same reference characters in Fig. 3. As earlier described the space between these surfaces 32 and 30 provide an entering aperture through which the sealing ring 6' may be inserted.

Numerals 33 and 34 denote the two double curved surfaces of the invention. These surfaces comprise inner and outer tore sealing surfaces generated by the revolution of a conic such as a circle about an axis which lies in its plane; which is parallel to the flat face 4'; and which is located below the flat face 4', a distance less than the radius of the conic. With this radial relationship the sealing ring 6' when not under compression will extend slightly above the surface of the flat face 4' as shown in Fig. 4.

In accordance with the invention the distance between the double curved surfaces 33 and 34 measured diametrically as shown in Fig. 5 is chosen of a magnitude corresponding to the diameter of a toric section of the sealing ring as is clearly illustrated in Figs. 3 and 4. Therefore, when the sealing ring is crowded into the groove it will lie in contact with each of the double curved surfaces 34 and 33 all the way around the groove. However, when compression of the workpiece W-2 is induced by suction and atmospheric pressure forces the sealing ring downwardly, compressed portions of the sealing ring move into the space 36 defined by the bottom double curved surface 38 as suggested in Fig. 3. Simultaneously with the ring being compressed it is drawn by suction forces circumferentially outwardly against the tore surface 33 to set up a tight seal with the inner peripheral portion of the ring tending to move slightly away from the double curved space 34 (Figure 3). In such a position of sealing it is pointed out that the presence of the closed hole H has no effect upon the vacuum held action of the chuck and thus an annular workpiece W-2 may be securely held. The outer sealing ring, however, acts in the opposite manner and seals against the surface 33 of its groove.

It will be apparent that for different size worpieces of annular form I may provide a series of rings as 8, 10 and 12 of increasing larger diameters. Each of these rings may have individual passage-ways and valving means for selectively controlling the removal of air.

In any one of these ring sealing arrangements however, it will be readily seen I may deal with a workpiece having no hole therein by removing air from a central passage-way occuring within the area defined by any given sealing ring. In such a case the suction occurs then draws the sealing ring against the inner double curved surface 34 with the outer peripheral surface of the sealing ring tending to draw away from the sealing surface 33. However, the space between the ring and the bottom double curved surface 38 operates to receive compression of the ring in exactly the same manner as was the case with sealing an annular type workpiece. By the means described, therefore, I am enabled to adapt the single ring of toric section in any desired size to holding a workpiece either of the annular or continuous form with equal efficiency.

From the foregoing description it will be apparent that I have disclosed an improved vacuum type chuck which has special adaptability to dealing with annularly shaped workpieces and which can, none the less, be applied with good results to a workpiece of disc shape or other unbroken form.

While I have shown a preferred embodiment of the invention, it will be understood that various changes and modifications may be resorted to within the scope of the appended claims.

Having thus described my invention, what I claim is:

1. A vacuum chuck for holding a workpiece of the class having an opening located centrally thereof, said vacuum chuck comprising a work-holding element, said work-holding element presenting a flat face which is recessed to provide ring retaining grooves, elastic sealing rings of toric cross section arranged in concentrically spaced relationship to one another in the said ring retaining grooves, each of said grooves being defined by a plurality of intersecting curved surfaces, including two upper most single curved surfaces of cylindrical shape lying in concentrically spaced relationship to one another, two double curved surfaces which intersect the single curved surfaces, said double curved surfaces being generated by the revolution of a conic about an axis which lies at its plane; which is parallel to the flat face of the work-holding element; which is located below the flat face a distance less than the radius of the conic, and a third double curved surface occurring at the bottom of the groove to define a space into which a respective elastic sealing ring may be compressed when a workpiece is retained on the work retaining element.

2. A structure according to claim 1, including suction means for selectively exerting suction forces whereby atmospheric pressure may operate to push an innermost sealing ring radially outwardly against an adjacent groove surface and whereby atmospheric pressure may operate to push an outermost sealing ring radially inward against an adjacent groove surface.

3. A structure according to claim 2 in which the suction means includes air passageways and means for selectively closing the air passageways at separated points therealong.

References Cited in the file of this patent

UNITED STATES PATENTS

| | | |
|---|---|---|
| 2,366,935 | Schmid | Jan. 9, 1945 |
| 2,443,987 | Morrison et al. | June 22, 1948 |
| 2,730,370 | Brewster | Jan. 10, 1956 |
| 2,832,602 | Coupe | Apr. 29, 1958 |
| 2,852,264 | Granata | Sept. 16, 1958 |